Dec. 6, 1927. 1,652,108

H. T. FORBIS

SWAB

Filed May 2, 1925

INVENTOR
H. T. Forbis,
BY Stevens & Batchelor
ATTORNEYS

Patented Dec. 6, 1927.

1,652,108

UNITED STATES PATENT OFFICE.

HAZEL TIETJEN FORBIS, OF MISSOULA, MONTANA.

SWAB.

Application filed May 2, 1925. Serial No. 27,559.

This invention relates to swabs and applicators especially adapted for use in connection with the nasal passages, the ears and the like.

Briefly stated, an important object of this invention is to provide a ready to use swab or medicament applicator consisting of a stem of suitable length and having one or both of its ends wrapped with a mass of cotton or the like to provide a soft and pliable and yet sufficiently rough body to cause the adherence of any foreign particles to be removed.

A further and equally important object of the invention is to provide a swab medicament applicator which is simple to use, cheap to manufacture and attractive in appearance.

Other objects and advantages will be apparent during the course of the following description.

In the accompanying drawing forming a part of this application and in which like numerals are employed to designate like parts throughout the same, Figure 1 is a perspective of a swab constructed in accordance with this invention and having both of its ends provided with cotton or other fibrous masses.

Figure 5 is a perspective illustrating the manner in which the stem is wrapped at one or both of its ends with cotton or the like.

Figure 1:
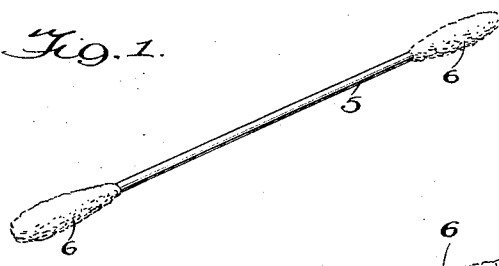
Figure 2:
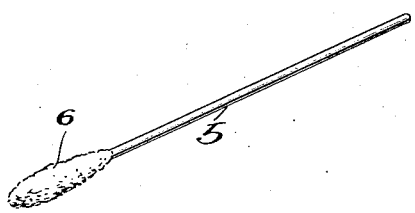
Figure 2 is a perspective of the improved swab and medicament applicator having only one of its ends provided with a fibrous mass.
Figure 3:
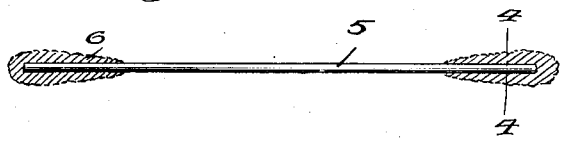
Figure 3 is a side elevation of the improved swab illustrated in Figure 1, the fibrous masses at the ends of the stem or shank being shown in section.
Figure 4:
Figure 4 is a transverse sectional view taken on line 4—4 of Figure 3.
Figure 5:
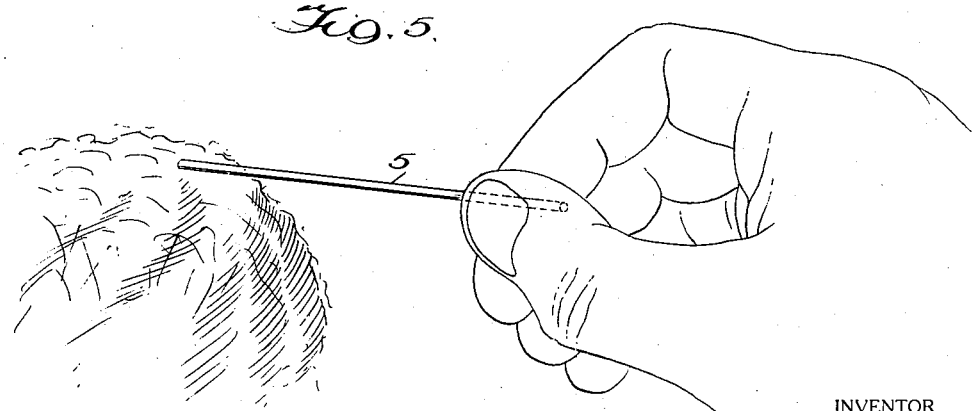

In the drawing wherein for the purpose of illustration is shown several preferred embodiments of the invention the numeral 5 designates a flexible shank or stem of the same width throughout and which may during the course of manufacture be dipped in a suitable dye or otherwise treated to give it color.

In the manufacture of the improved swab the end or ends of the stem are dipped into a liquid antiseptic solution and are then while still moist or wet, gently but firmly, and with a twisting motion, pressed into a mass of porous material. This will draw a quantity of the material onto the stick and it will by reason of the presence of the liquid firmly set on the shank. That is to say, the porous mass or masses 6 at one or both of the ends of the stem will be neatly formed and will have approximately the shape of a bulb.

Of course the porous masses at the ends of the stem are suitably colored and they are preferably medicated, although this step may be omitted without in any way departing from the spirit of the invention and the scope of what is claimed.

The improved swab and medicament applicator may if desired be sold in packages for use in the nursery and elsewhere and provides a quick, safe and economical means for cleaning the nostrils or ears of an infant or child.

As an article of manufacture the improved swab and medicament applicator is meeting with commercial success since it provides a convenient and ready to use swab at a very low cost.

Having thus described the invention what is claimed is:

As an article of manufacture, a flexible stem of substantially the same thickness throughout and having its ends provided with an antiseptic, and wisps of cotton treated with an antiseptic wrapped about the ends of the stem and firmly attached thereto.

In testimony whereof I affix my signature.

HAZEL TIETJEN FORBIS.